United States Patent [19]
Daido et al.

[11] Patent Number: 5,355,315
[45] Date of Patent: Oct. 11, 1994

[54] ELECTRIC POWER STEERING APPARATUS

[75] Inventors: Toshihiko Daido, Uda; Hirofumi Matsuoka, Souraku; Mitsuhiko Nishimoto, Yoshino; Osamu Sano, Kashihara, all of Japan

[73] Assignee: Koyo Seiko Co., Ltd., Osaka, Japan

[21] Appl. No.: 942,739

[22] Filed: Sep. 9, 1992

[30] Foreign Application Priority Data

Jun. 29, 1991 [JP] Japan ................... 4-196407
Sep. 30, 1991 [JP] Japan ................... 3-280802

[51] Int. Cl.$^5$ ............................ B62D 5/04
[52] U.S. Cl. .................... 364/424.05; 180/79.1; 180/142
[58] Field of Search ............. 364/424.05; 180/79.1, 180/141, 142

[56] References Cited

U.S. PATENT DOCUMENTS

| | | | |
|---|---|---|---|
| 4,753,309 | 6/1988 | Marumoto et al. | 180/79.1 |
| 4,771,843 | 9/1988 | Shimizu | 364/424.05 |
| 4,907,668 | 3/1990 | Onishi et al. | 180/142 |
| 4,957,182 | 9/1990 | Morishita et al. | 364/424.05 |
| 4,959,787 | 9/1990 | Morishita et al. | 364/424.05 |
| 4,972,320 | 11/1990 | Sugiura et al. | 364/424.05 |
| 4,996,890 | 3/1991 | Taniguchi et al. | 73/862.33 |
| 5,076,381 | 12/1991 | Daido et al. | 364/424.05 |

FOREIGN PATENT DOCUMENTS

| | | |
|---|---|---|
| 3414346 | 4/1985 | Fed. Rep. of Germany . |
| 62-034856 | 2/1987 | Japan . |
| 63-188731 | 4/1988 | Japan . |

Primary Examiner—Thomas G. Black
Assistant Examiner—Tyrone V. Walker
Attorney, Agent, or Firm—Darby & Darby

[57] ABSTRACT

In an electric power steering apparatus, a signal processing circuit for a torque sensor for detecting a steering torque and a control circuit for controlling the driving of a steering assisting electric motor on the basis of the result of the signal processing by the signal processing circuit are formed on the same common circuit board. The common circuit board is mounted inside a housing accommodating the torque sensor, a housing accommodating a steering shaft, or a housing accommodating a steering gear.

9 Claims, 12 Drawing Sheets

ELECTRIC POWER STEERING APPARATUS

BACKGROUND OF THE INVENTION

1. Field of the Invention

The present invention relates to an electric power steering apparatus for assisting the force required to turn the steering wheel of a vehicle.

2. Description of the Related Art

An electric power steering apparatus for a vehicle uses an electric motor to assist the steering force required to steer the vehicle. The electric power steering apparatus includes a steering mechanism which is linked via a shaft a steering wheel and which is provided with a non-contact torque sensor for detecting the rotational force applied at the steering wheel, as well as the electric motor for assisting the operation of the steering mechanism; the electric motor is driven in response to the torque detected by the torque sensor to lessen the steering force at the steering wheel.

Figure 1:
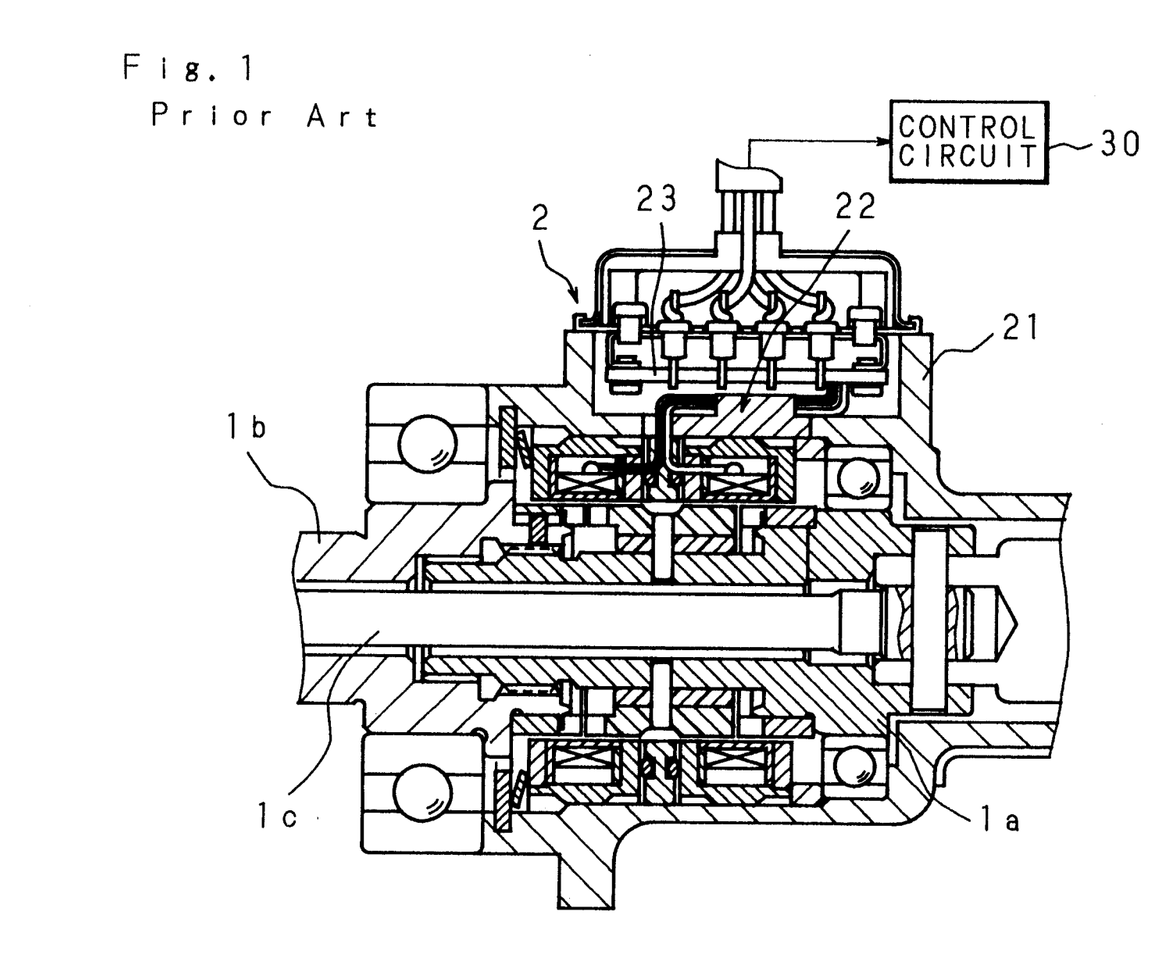
FIG. 1 is a cross sectional view of a torque sensor used in a conventional electric power steering apparatus.

The torque sensor has the construction shown, for example, in FIG. 1, FIG. 1 is a cross sectional view of a torque sensor used in a conventional electric power steering apparatus, The reference numeral 1a designates an input shaft connected to a steering wheel (not shown), and the input shaft 1a is concentrically connected through a torsion. bar 1c to an output shaft 1b connected to a steering mechanism (not shown). At the connection between the input shaft 1a and the output shaft 1b, there is mounted a non-contact torque sensor 2 which contains in its housing 21 a magnetic coupler 22 whose magnetic coupling changes in accordance with the twisting of the torsion bar 1c. The torque sensor 2 detects the change in the magnetic coupling and performs predetermined signal processing on tile detected change to measure the steering torque applied to the torsion bar 1c. A signal processing circuit (not shown) formed on a torque sensor circuit board 23 disposed outwardly of the magnetic coupler 22 within the housing 21 is used for the signal processing.

The result of ,he signal processing by the signal processing circuit (the torque detection signal) is inputted to a control circuit 30 formed on a control circuit board (not shown) disposed at a preset place outside the torque sensor 2. The control circuit 30 controls the driving of the electric motor according to the steering torque measured by the torque sensor 2.

However, in the above conventional electric power steering apparatus, since the torque sensor circuit board 23 and the control circuit board are disposed at respectively separate places, the number of components and the manhour required for the production of the apparatus increase accordingly, resulting in an increase in the production cost of the apparatus.

SUMMARY OF THE INVENTION

It is an object of the invention to provide an electric power steering apparatus that allows a reduction both in the number of components and the manhour for production.

It is another object of the invention to provide an electric power steering apparatus that achieves a reduction in the production cost.

In the electric power steering apparatus of the invention, a signal processing circuit for a torque sensor for detecting a steering torque and a control circuit for controlling the driving of a steering assisting motor on the basis of the result of the signal processing by the signal processing circuit are formed on the same circuit board. This circuit board is mounted, for example, inside the housing of the torque sensor.

According to the invention, since the signal processing circuit for the torque sensor and the control circuit for controlling the driving of the motor are formed on the same circuit board, the number of components and the manhour are reduced as compared with an arrangement requiring these circuits to be formed on separate circuit boards. The reduced number of components contributes to reducing the production cost.

The above and further objects and features of the invention will more fully be apparent from the following detailed description with accompanying drawings.

DESCRIPTION OF THE PREFERRED EMBODIMENTS

The preferred embodiments of the present invention will now be described with reference to the accompanying drawings.

Figure 2:
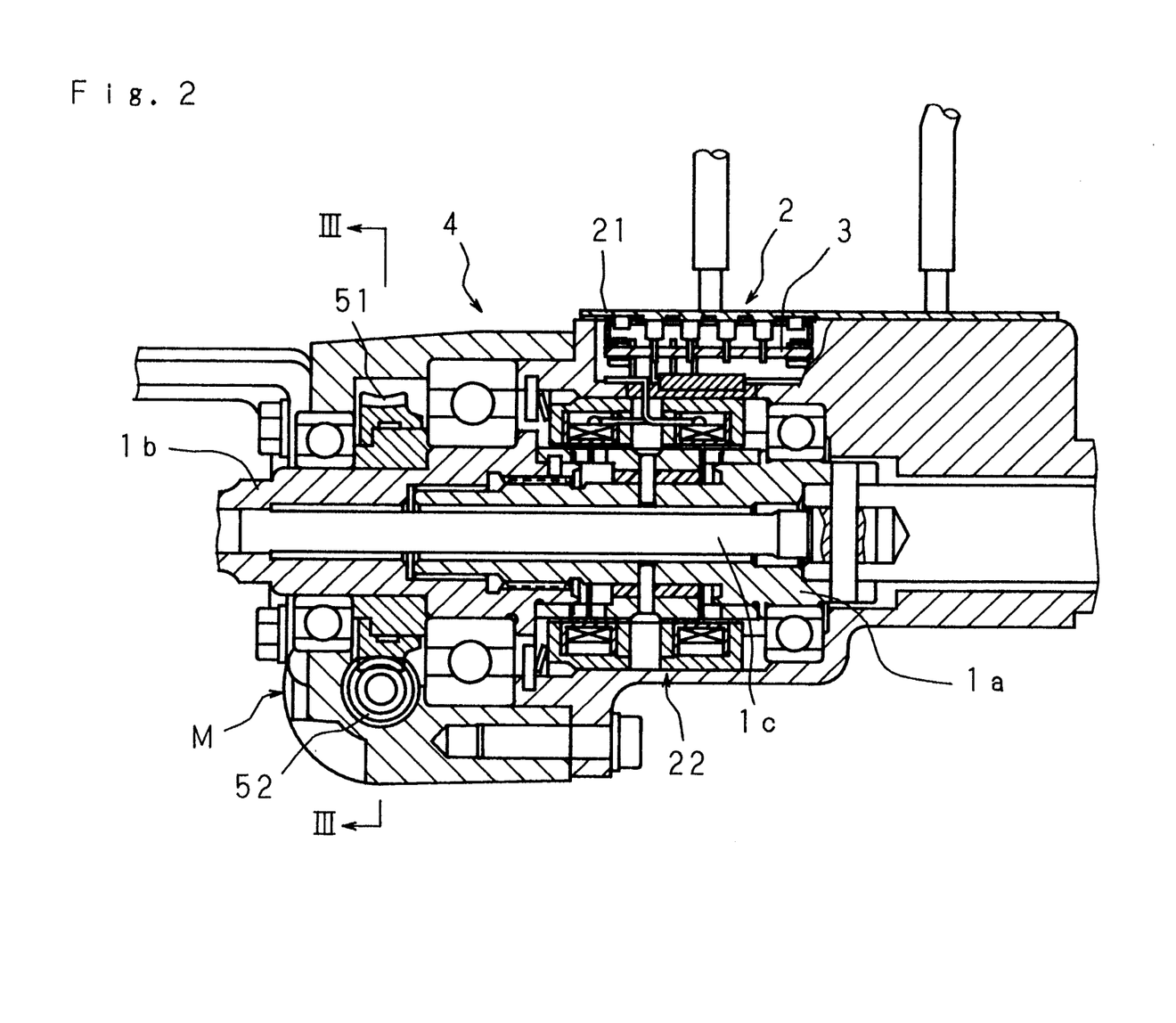
FIG. 2 is a cross sectional view of a torque sensor used in an electric power steering apparatus according to the invention.
Figure 3:
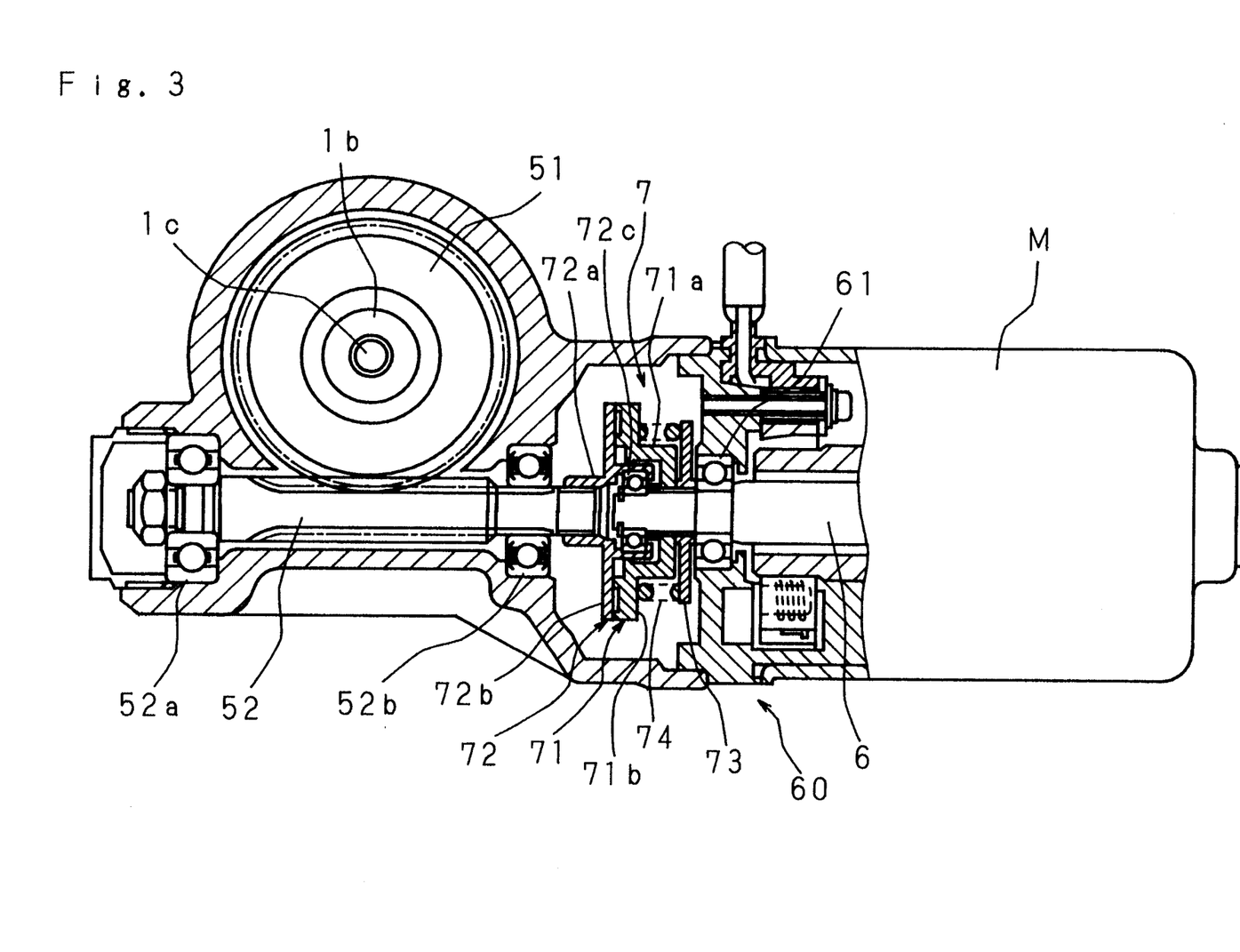
FIG. 3 is a cross sectional view taken along line III—Ill in FIG. 2.

FIG. 2 is a cross sectional view of a torque sensor used in an electric power steering apparatus according to the present invention, and FIG. 3 is a cross sectional view taken along line III—III in FIG. 2.

The reference numeral 1a designates an input shaft connected to a steering wheel (not shown). The input shaft 1a is concentrically connected through a torsion bar 1c to an output shaft 1b which is connected to a steering mechanism (not shown). At the connection between the input shaft 1a and the ouput shaft 1b, there is mounted a non-contact torque sensor 2 which contains in its housing 21 a magnetic coupler 22 whose magnetic coupling changes in accordance with the twisting of the torsion bar 1c. The torque sensor 2 detects the change in the magnetic coupling and performs predetermined signal processing on the detected change to measure the steering torque applied to the torsion bar 1c.

A signal processing circuit (not shown) formed on a circuit board 3 disposed outwardly of the magnetic coupler 22 within the housing 21 is used for the signal processing in the torque sensor 2. The result of the signal processing by the signal processing circuit (i.e. the torque detection signal) is given to a control circuit (not shown) formed on the circuit board 3. The control circuit controls the driving of a motor on the basis of the torque measured by the torque sensor 2. Both the signal processing circuit and the control circuit are thus formed on the same circuit board 3, which is made possible by simplifying the control circuitry as will be described later.

Attached to the output shaft 1b side of the housing 21 is a housing 4 which mainly accommodates components for providing steering assisting power. Inside the housing 4 and halfway down the axial length of the output shaft 1b, a large-diameter worm wheel 51 is fixed onto the output shaft 1b so that the output shaft 1b is rotated with the rotation of the worm wheel 51. The worm wheel 51 meshes with a worm 52 which is rotated by the driving force of a steering assisting motor M, thus forming a worm gear that constitutes the steering gear.

The worm 52 is supported at both axial ends thereof by bearings 52a and 52b within the housing 4. The steering assisting motor M is located on an extended direction from one end of the worm 52. The motor M has a drive shaft 6 that is supported at midpoint by a ball bearing 61 which is centered in a casing 60 of the motor M. The drive shaft 6 is mounted in such a manner that the end face of the drive shaft 6 faces one end face of the worm 52 with a predetermined spacing provided therebetween. The drive shaft 6 of the motor M and the worm 52 are coupled together by a torque limiter 7 provided therebetween.

A first disc-shaped friction member 71 forming a part of the torque limiter 7 is concentrically clamped in spline fashion onto the drive shaft 6 at a position spaced apart by a predetermined distance from the shaft end toward the motor M, and a second disc-shaped friction member 72 also forming a part of the torque limiter 7 is concentrically clamped in spline fashion onto the one end of the worm 52. The first, friction member 71 consists of a cylindrical portion 71a with a closed bottom clamped onto the drive shaft 6, and a friction disc plate 71b outwardly extending radially from the periphery of the cylindrical portion 71a. The second friction member 72 consists of a boss 72a clamped onto the worm 52 and a friction disc plate 72b outwardly extending radially from the boss 72a. The respective faces of the friction plate 71b and the friction plate 72b are opposite each other.

The boss 72a of the second friction member 72 is provided with a circular groove cut to a predetermined depth in the interior surface thereof positioned inside the first friction member 71. Inside the circular groove is fitted a ball bearing 72c which supports the end portion of the drive shaft 6. Clamped onto the portion of the drive shaft 6 between the first friction member 71 and the ball bearing 61 is a support disc plate 73 which forms a part of the torque limiter 7. A spring 74 also forming a part of the torque limiter 7 is interposed between the support plate 73 and the friction plate 71b of the first friction member 71.

In the thus constructed torque limiter 7, during normal rotation of the motor M, the friction plate 71b of the first friction member 71 is pressed against the friction plate 72b of the second friction member 72 by the urging force of the spring 74, so that the first friction-member 71 and the second friction member 72 are caused to revolve together to transmit the rotational force of the motor M to the worm 52, the rotational force being transmitted at the steering assisting power via the worm 52 and the worm wheel 51 to the output shaft 1b. If the motor M locks and, in that condition, an excessive force is exerted on the worm 52 by the steering action, this excessive force causes the friction plate 72b of the second friction member 72 to slip against the friction plate 71b of the first friction member overcoming the urging force of the spring 74, thereby preventing the steering maneuver by the steering wheel from being disabled due to the locking of the motor M. Manual steering is thus made possible.

Figure 4:
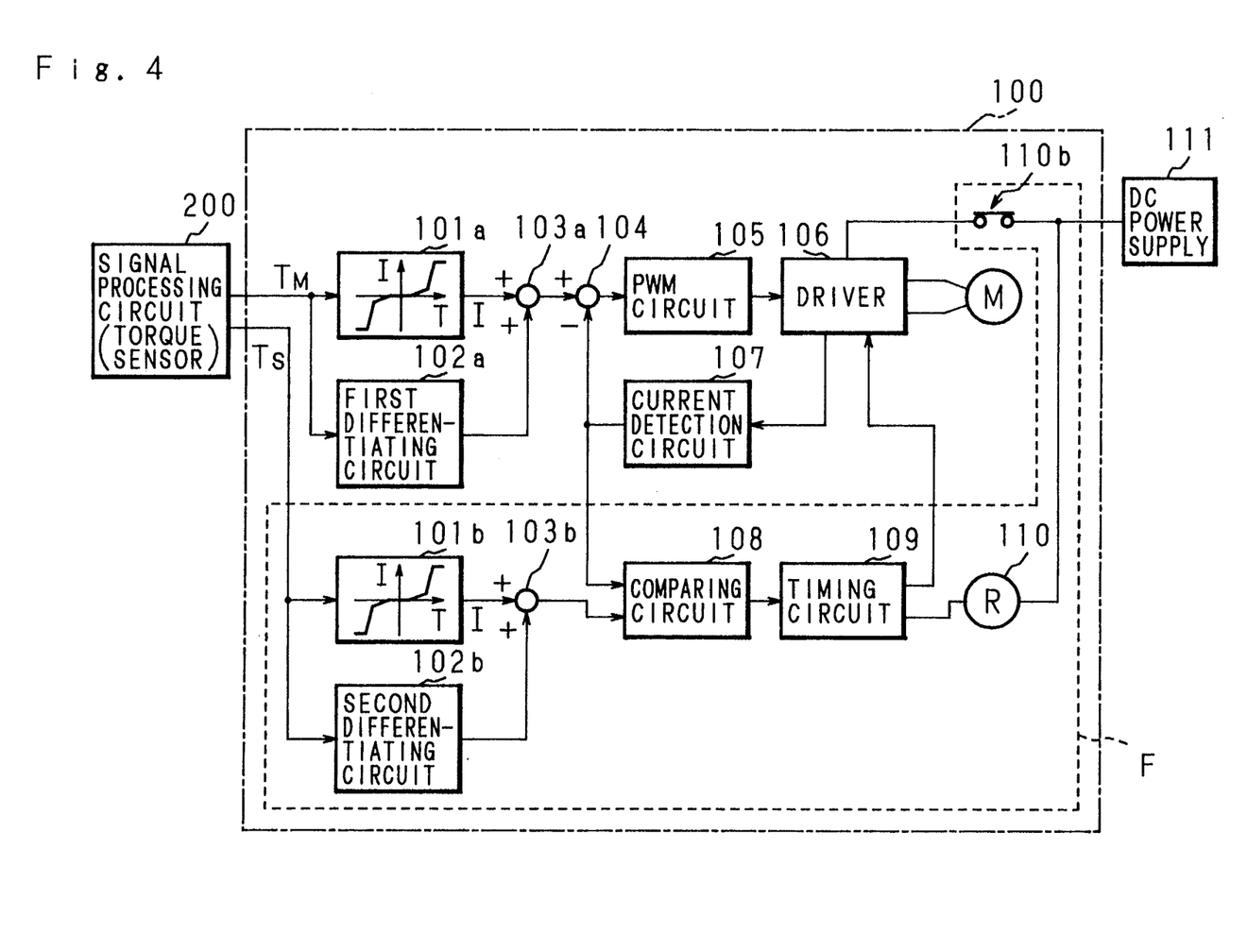
FIG. 4 is a block diagram showing the configuration of a control circuit for the electric power steering apparatus of the invention.

Next, we will describe a control circuit for the electric power steering apparatus of the invention. FIG. 4 is a block diagram showing the configuration of the control circuit for the electric power steering apparatus of the invention, and FIG. 5 is a graph showing the function characteristics of a first function generating circuit 101a and a second function generating circuit 101b in the control circuit.

The reference numeral 100 designates the control circuit. A signal processing circuit 200 for the torque sensor 2 outputs torque detection values in the form of paired signals, TM and TS, which are inputted to the control circuit 100. In the control circuit 100, the torque detection values TM and TS are respectively supplied to the first function generating circuit 101a and the second function generating circuit 101b, each of which outputs a tentative target current value I for driving the motor. The torque detection values TM and TS are also supplied to a first differentiating circuit 102a and a second differentiating circuit 102b which respectively differentiate the torque detection values TM and TS.

Figure 5:
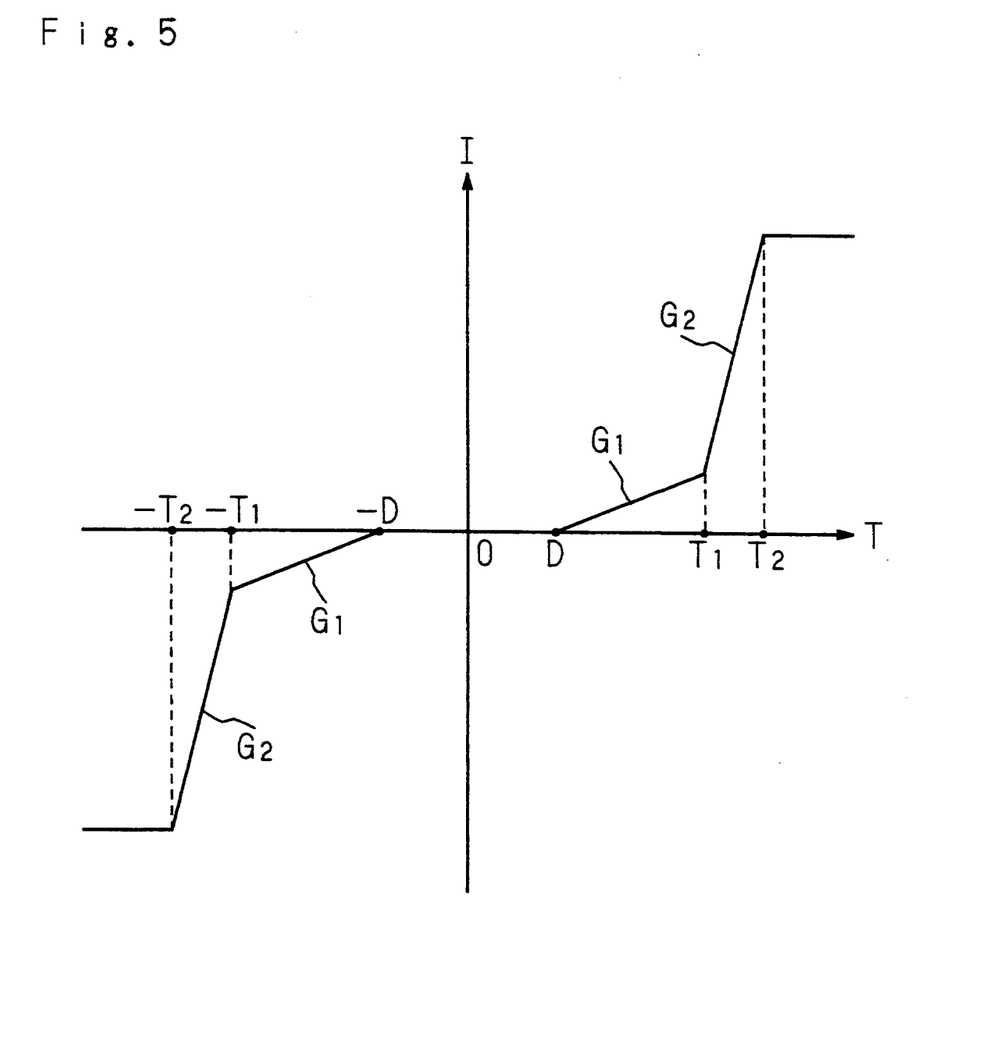
FIG. 5 is a graph showing the function characteristics of a first function generating circuit and a second function generating circuit in the control circuit.

As shown in FIG. 5, the first function generating circuit 101a and the second function generating circuit 101b are provided with function characteristics such that in the ranges of the torque detection value T (corresponding to TM, TS) outside the dead zone of $-D$ to $D$, the target current value I increases in proportion to an increase in the torque detection value T, first in accordance with a first gain characteristic G1 until the torque detection value T reaches a first set value ($-T1$, $T1$), and then, in accordance with a second gain characteristic G2 having a greater slope than the first gain characteristic G1, until the torque detection value T reaches a second set value ($-T2$, $T2$), the target current value I being saturated when the torque detection value T exceeds value T2.

The aim of the above function characteristics will now be explained. In a vehicle equipped with power-assisted steering, the steering assisting power must be increased at slower speeds and decreased at higher speeds in order to provide a natural steering feel. Generally, at slower speeds, a larger steering torque tends to be applied to the steering wheel, while on the other hand, the torque applied to the steering wheel is usually small at higher speeds. Therefore, according to the above functions, when a small steering torque is applied, it is assumed that the vehicle is being driven at high speed, and consequently, the ratio of the target current value I to the torque detection value T is set at a smaller value (the first gain characteristic G1); on the other hand, when a large steering torque is applied, it is assumed that the vehicle is being driven at slow speed, and consequently, the ratio of the target. current value I to the torque detection value T is set at a larger value (the second gain characteristic G2). This ensures a natural steering feel when driving the vehicle.

The first function generating circuit 101a sets the target current value I proportionate to the torque detection value TM in accordance with the above function, and supplies the output to a first adder 103a, while the second function generating circuit 101b sets the target current value I proportionate to the torque detection value TS in accordance with the above function, and supplies the output to a second adder 103b. The first differentiating circuit 102a differentiates the torque detection value TM and supplies the result to the first adder 103a, while the second differentiating circuit 102b differentiates the torque detection value TS and supplies the result to the second adder 103b.

The first adder 103a adds the target current value I given from the first function generating circuit 101a and the result of differentiation given from the first differentiating circuit 102a, and supplies the result of the addition to a subtractor 104. On the other hand, the second adder 103b adds the target current value I given from the second function generating circuit 101b and the result of differentiation given from the second differentiating circuit 102b, and supplies the result of the addition to a comparing circuit 108.

A motor current value from a driver 106, formed from a bridge circuit of switching elements for supplying current to drive the motor M, is detected by a current detection circuit 107 formed from a low-pass filter, and the detected motor current value is given to the subtractor 104 as well as to the comparing circuit 108.

The subtractor 104 subtracts the motor current value from the result of addition given from the first adder 103a, and supplies the result of the subtraction, i.e. the steering assisting force command value, to a PWM circuit 105. The PWM circuit 105 outputs a PWM signal corresponding to the steering assisting force command value. The PWM signal is given to the driver 106 to drive the switching elements of the driver 106, thereby producing a motor driving voltage in pulse form corresponding to the PWM signal, to drive the motor M.

On the other hand, the comparing circuit 108 compares the motor current value with the result of addition given from the second adder 103b, and if the difference between the two values is greater than a predetermined value, supplies a time signal to a timing circuit 109 to initiate a time counting operation by the timing circuit 109. The timing circuit 109 counts the time during which the time signal is continuously generated, and when the time being counted has exceeded a predetermined time, gives a drive disabling signal to the driver 106 to disable the operation of the driver 106 and, at the same time, an activation signal to a relay 110 that includes a normally closed contact 110b provided on the electrical path between the driver 106 and a DC power supply 111 for driving the motor M. When the drive disabling signal is given to the driver 106, the driving of the motor M is disabled, and when the relay 110 is activated, the normally closed contact 110b is opened to cut off power from the DC power supply 111 to the motor M, thus stopping the motor M. That is, in this control system, the second function generating circuit 101b, the second differentiating circuit 102b, the second adder 103b, the comparing circuit 108, the timing circuit 109, and the relay 110 constitute a fail-safe circuit F.

The following describes how the above configured control circuit 100 is simplified as compared with the conventional control circuit. In the prior art, complicated processing was performed to determine the target current value, which involved the processing of changing the relationship between the torque detection value T and the target current value I on the basis of a vehicle speed detection value. Such processing required the use of a microcomputer. The control circuit 100 of the present embodiment, on the other hand, achieves simple processing whereby the target current value I is directly determined from the torque detection value T. Since this processing can be accomplished by a simple hardware circuit, the control circuit is simplified in configuration.

Furthermore, in the conventional fail-safe control, in addition to the microcomputer for controlling the motor driving, a microcomputer dedicated for fail-safe control was used to perform fail-safe control in case of failure of the motor driving control microcomputer by monitoring the inputs/outputs to and from the latter microcomputer. In the present embodiment, however, fail-safe control is achieved by the fail-safe circuit F of simple configuration as described above, which serves to simplify the configuration of the control circuit.

Simplification of the control circuit means a reduction in the size of the control circuit, and hence a reduction in the size of the circuit board on which the control circuit 100 is to be formed. As a result, the control circuit 100 can be integrated with the signal processing circuit 200 for the torque sensor 2, which processing circuit is conventionally mounted inside the housing 21 of the torque sensor 2; thus, both the control circuit 100 and the signal processing circuit 200 can be formed on the same circuit board 3 mounted inside the housing 21 of the torque sensor 2.

Figure 6:
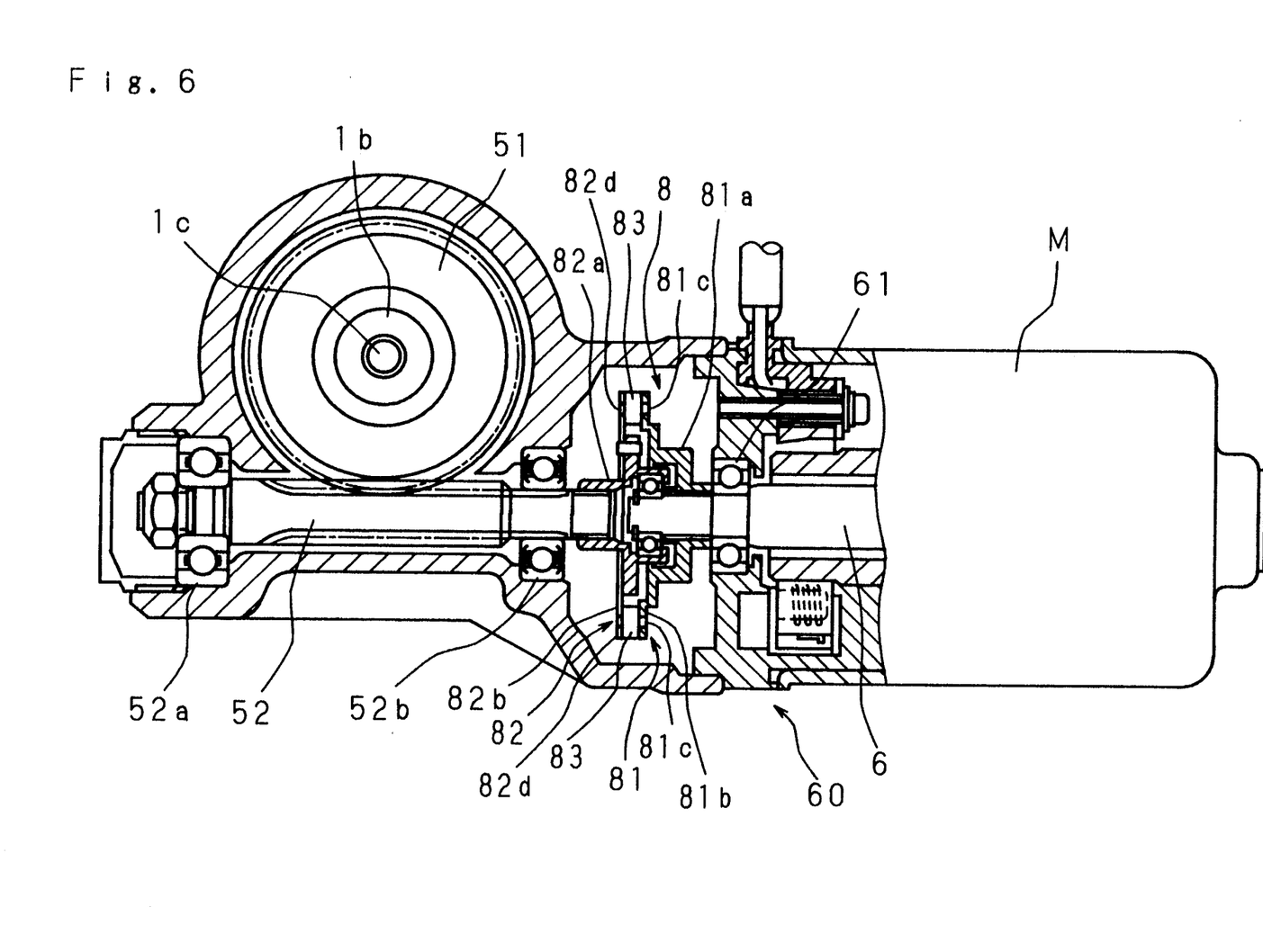
FIG. 6 is a cross sectional view showing an alternative construction of the torque limiter of the present embodiment.

FIG. 6 is a cross sectional view showing an alternative construction of the torque limiter of the present embodiment. The torque limiter shown has the same function as the one described above. In FIG. 6, the reference numerals designating corresponding parts are the same as those in FIG. 3, and description of each of those parts is omitted hereinafter.

A first disc-shaped member 81 forming a part of a torque limiter 8 is concentrically clamped in spline fashion onto the drive shaft 6 at a position spaced away by a predetermined distance from the shaft end toward the motor M, and a second disc-shaped member 82 also forming a part of the torque limiter 8 is concentrically clamped in spline fashion onto one end of the worm 52. The first member 81 consists of a cylindrical portion 81a with a closed bottom clamped onto the drive shaft 6, and a disc portion 81b outwardly extending radially from the periphery of the cylindrical portion 81a. The second member 82 consists of a boss 82a clamped onto the worm 52 and a thin disc portion 82b outwardly extending radially from the boss 82a. The corresponding faces of the disc portions 81b and 82b are opposite each other.

The disc portion 81b includes a plurality of through-holes 81c, 81c, . . . formed in concentric relationship therewith, and the disc portion 82b includes a plurality of throughholes 82d, 82d, . . . formed in concentric relationship therewith and opposite to the corresponding throughholes 81c, 81c, . . . In between the disc portions 81b and 82b are a plurality of interposing members 83 made of plastic each having small-diameter projections on both sides thereof, the projection on one side being fitted into the facing throughhole 81c and the projection on the other side into the corresponding throughhole 82d. The boss 82a of the second member 82 is provided with a circular groove cut to a predetermined depth in the interior surface thereof positioned inside the first member 81. Inside the circular groove is fitted a ball bearing 82c which supports the end portion of the drive shaft 6. The rear end of the first member 81 clamped on the drive shaft 6 abuts against the ball bearing 61. The interposing members 83 are formed, for example, by injection molding.

In the thus constructed torque limiter 8, during normal rotation of the motor M, the first member 81 and the second member 82 are coupled together by the interposing members 83 and thus caused to revolve together to transmit the rotational force of the motor M to the worm 52, the rotational force thus being transmitted as the steering assisting force via the worm 52 and the worm wheel 51 to the output shaft 1b. If the motor M locks and, in that condition, an excessive force is exerted on the worm 52 by steering action, this excessive force causes the projections of the interposing members 83 to break, severing the coupling between the disc portion 81b of the first member 81 and the disc portion 82b of the second member 82, thereby preventing the steering maneuver by the steering wheel from being disabled due to the locking of the motor M. Manual steering is thus made possible.

Figure 7:
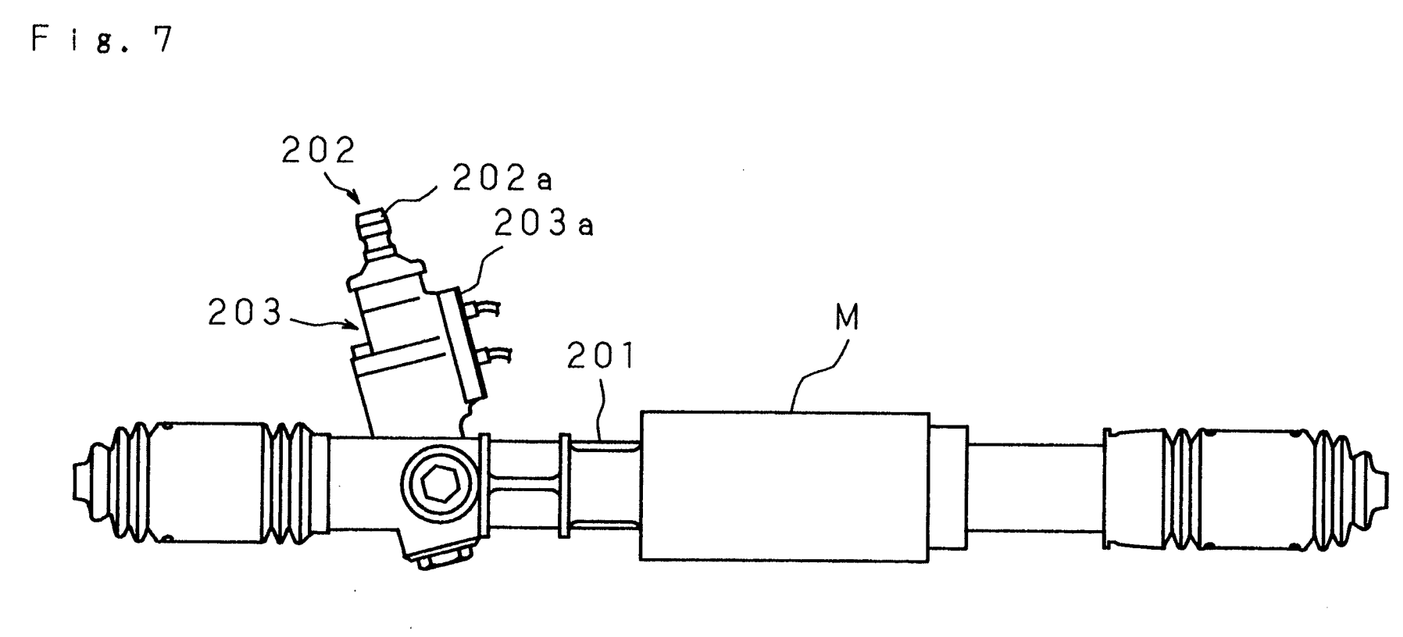
FIG. 7 is a front view of an electric power steering apparatus of another type, illustrating the mounting position of the circuit board.

Next, we will describe the mounting position of the above configured circuit board 3 in an electric power steering apparatus of another type. FIG. 7 is a front view of an electric power steering apparatus of another type, illustrating the mounting position of the circuit board 3. The reference numeral 201 designates a rack shaft case which accommodates a rack shaft. A motor M is mounted on one side of the rack shaft case 201 halfway down the longitudinal length thereof. The reference numeral 202 designates a steering shaft which consists of an input shaft 202a and an output shaft (not shown) and is connected at one end to a steering wheel. At the other end of the steering shaft 202 is a housing 203 mounted adjacent to one end of the rack shaft case 201, the housing 203 supporting the steering shaft 202 with its axis tilted relative to the rack shaft. The housing 203 includes a circuit board case 203a for accommodating the above-described circuit board 3. In the electric power steering apparatus of such construction, the circuit board 3 is housed in the circuit board case 203a that forms a part of the housing 203.

In the present embodiment, the circuit board 3 is mounted inside the housing 21 (or the housing 203) that accommodates the torque sensor 2, the input shaft 1a and the output shaft 1b (or the steering shaft 202), etc. Alternatively, the circuit board 3 may be mounted inside the housing 4 that accommodates the worm wheel 51, worm 52, etc.

Figure 8:
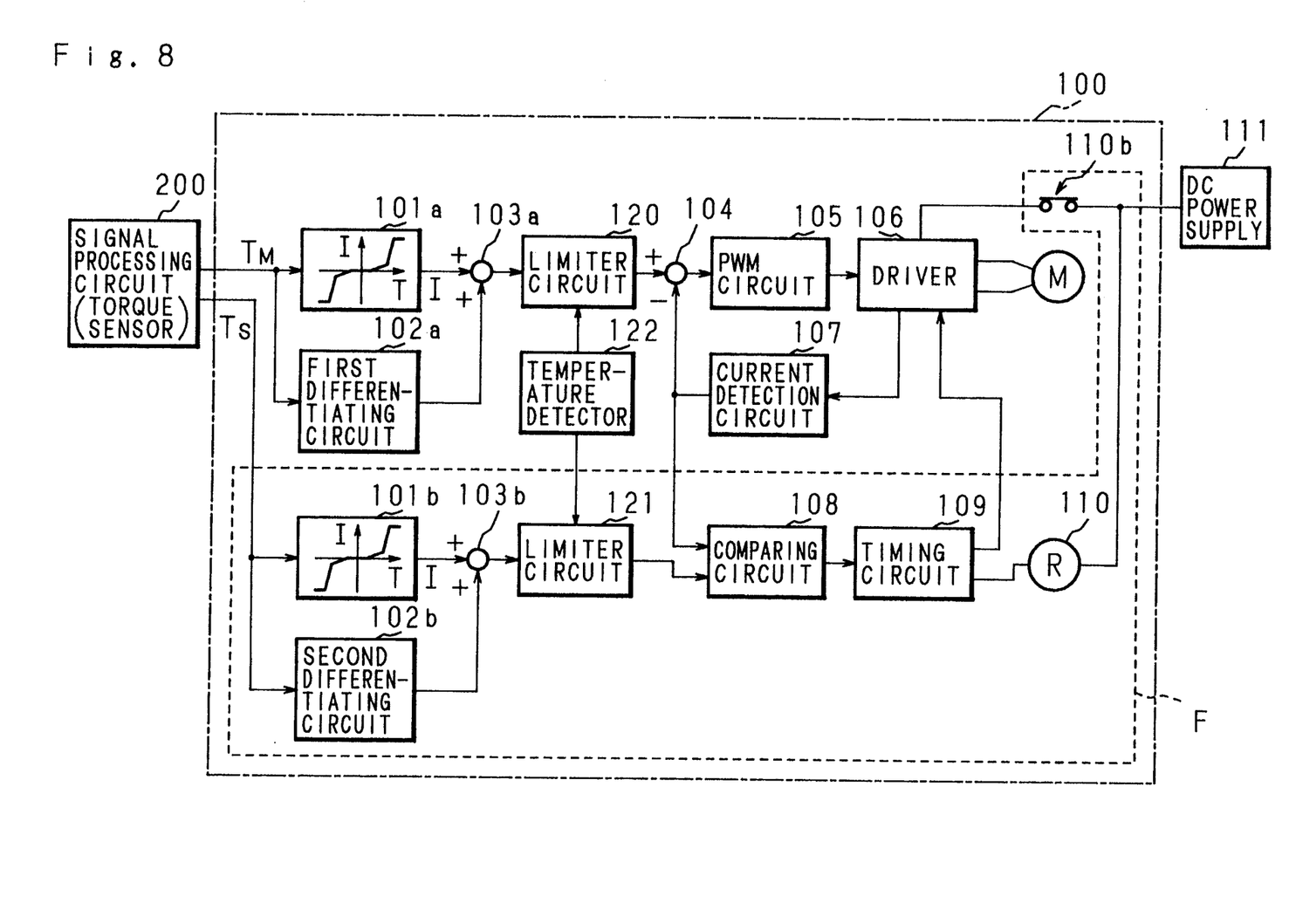
FIG. 8 is a block diagram showing another example of the control circuit for the electric power steering apparatus of the invention.

FIG. 8 is a block diagram showing an alternative configuration of the control circuit for the electric power steering apparatus of the invention. The voltage from the first adder 103a, representing the result of addition, is given to a limiter circuit 120, which outputs a voltage to supply to the subtractor 104. On the other hand, the voltage form the second adder 103b, representing the result of addition, is given to a limiter circuit 121, which outputs a voltage to supply to the comparing circuit 108.

A temperature-sensing element, for example, a thermistor, is attached to the radiating fin of the switching elements forming the driver 106 or to the brush holder of the motor M. A temperature detector 122, constructed by using the thermistor, outputs a temperature detection voltage which is supplied to the limiter circuits 120 and 121. Otherwise, the configuration is the same as that of the control circuit shown in FIG. 4, and like numerals are used to designate the corresponding components to those in FIG. 4.

Figure 9:
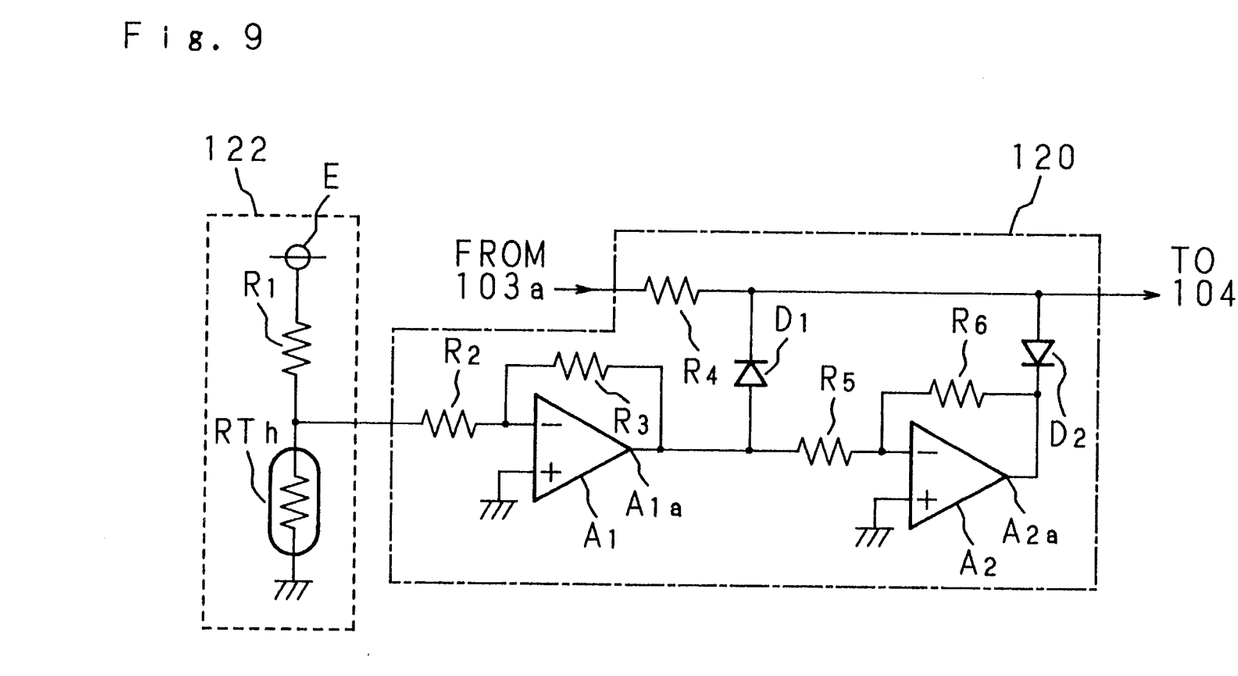
FIG. 9 is a circuit diagram showing the configurations of a temperature detector and a limiter circuit.

FIG. 9 is a circuit diagram showing the configurations of the temperature detector 122 and the limiter circuit 120. The temperature detector 122 has a resistor R1 and a thermistor RTh connected in series, one end of the series circuit being connected to a power supply E and the other end to the ground.

The limiter circuit 120 has resistors, R2 to R6, diodes D1, D2, and inverting amplifiers A1, A2. The positive input terminal "+" of the inverting amplifier A1 is grounded, while the negative input terminal "−" thereof is connected via the resistor R2 to a node between the resistor R1 and the thermistor RTh in the temperature detector 122. The output terminal A1a of the inverting amplifier A1 is connected via the resistor R3 to its negative input terminal "−", and via the resistor R5 to the negative input terminal "−" of the inverting amplifier A2.

The output terminal A1a is also connected to the anode of the diode D1 and via which to one end of the resistor R4. At the other end of the resistor R4 is applied a voltage from the first adder 103a, the voltage representing the result of addition. The node between the resistor R4 and the diode D1 is connected to the anode of the diode D2 and via which to the output terminal A2a of the inverting amplifier A2. The output terminal A2a of the inverting amplifier A2 is also connected via the resistor R6 to its negative input terminal "−" while the positive input terminal "+" thereof is grounded. The voltage derived from the node between the resistor R4 and the diodes D1, D2 is supplied to the subtractor 104.

Next, we will describe the operation of the temperature detector 122 and the limiter circuit 120. Now consider the situation where the thermistor RTh is attached to the brush holder of the motor M and the motor M is at normal temperature. The resistance of the thermistor RTh is high, and therefore, the voltage derived at the node between the resistor R1 and the thermistor RTh, i.e. the temperature detection voltage in the temperature detector 122, is also high. Here, if the motor M is overloaded, causing the temperature to rise, the resistance of the thermistor RTh decreases with increasing temperature, which causes the temperature detection voltage to decrease. When the temperature detection voltage is inputted to the inverting amplifier A1, a negative voltage is outputted at the output terminal A1a thereof, the negative output voltage varying in proportion to the temperature detection voltage. The negative voltage outputted from the inverting amplifier A1 is inputted to the inverting amplifier A2 which outputs a positive voltage at its output terminal A2a. Consequently, the positive voltage outputted from the inverting amplifier A2 varies in proportion to the voltage outputted from the inverting amplifier A1, i.e., the temperature detection voltage.

The output voltage of the inverting amplifier A1 is given via the diode D1 to the node between the resistor R4 and the diodes D1, D2, thus setting a lower limit on the negative voltage supplied from the first adder 103a and thereby preventing it from dropping below the output voltage of the inverting amplifier A1. On the other hand, the voltage derived at the node between the resistor R4 and the diodes D1, D2 is given via the diode D2 to the output terminal A2a of the inverting amplifier A2, thus setting an upper limit on the positive voltage supplied from the first adder 103a and thereby preventing it from exceeding the output voltage of the inverting amplifier A2. In this manner, the upper and lower limits are set on the voltage supplied from the first adder 103a to the limiter circuit 120 according to the temperature of the motor M.

Figure 10:
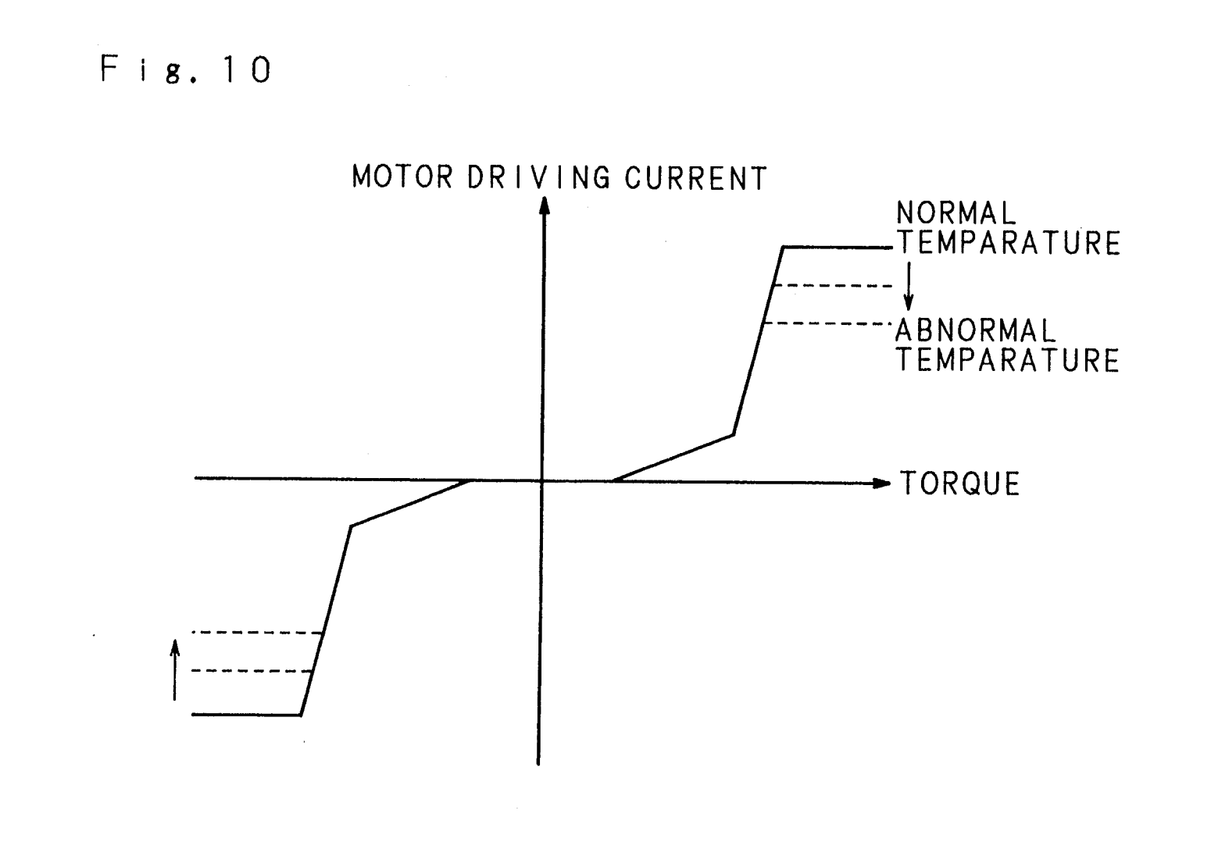
FIG. 10 is a characteristic diagram showing the relationship between the temperature detected by the temperature detector and the motor driving current.

The voltage outputted from the limiter circuit 120 is supplied to the subtractor 104, and the result of the subtraction by the subtractor 104, i.e. the steering assisting force command value, is given to the PWM circuit 105, to operate the switching elements of the driver 106 to drive the motor M. When the temperature of the motor M rises abnormally, the voltage supplied from the first adder 103a, i.e. the result of addition, is limited as described above, so that the current to drive the motor M is lowered as shown by a dotted line in FIG. 10 to prevent the temperature of the motor M from rising and thus protect the motor M against abnormal overheating. In an arrangement in which the thermistor RTh is attached to the radiating fin of the switching elements of the driver 106, abnormal overheating of the switching elements, and hence the breakage thereof, can be prevented.

The limiter circuit 121 is identical in configuration to the limiter circuit 120. The temperature detection voltage from the temperature detector 122 is inputted to the limiter circuit 121, the output voltage of which is given to the comparing circuit 108. That is, the voltage outputted from the second adder 103b is applied to one end of the resistor R4, and the voltage derived at the node between the other end of the resistor R4 and the diodes D1, D2 is supplied to the comparing circuit 108. As with the limiter circuit 120, the limiter circuit 121 also has the function of setting the lower and upper limits on the voltage supplied from the second adder 103b according to the temperature detection voltage supplied from the temperature detector 122.

Figure 11:
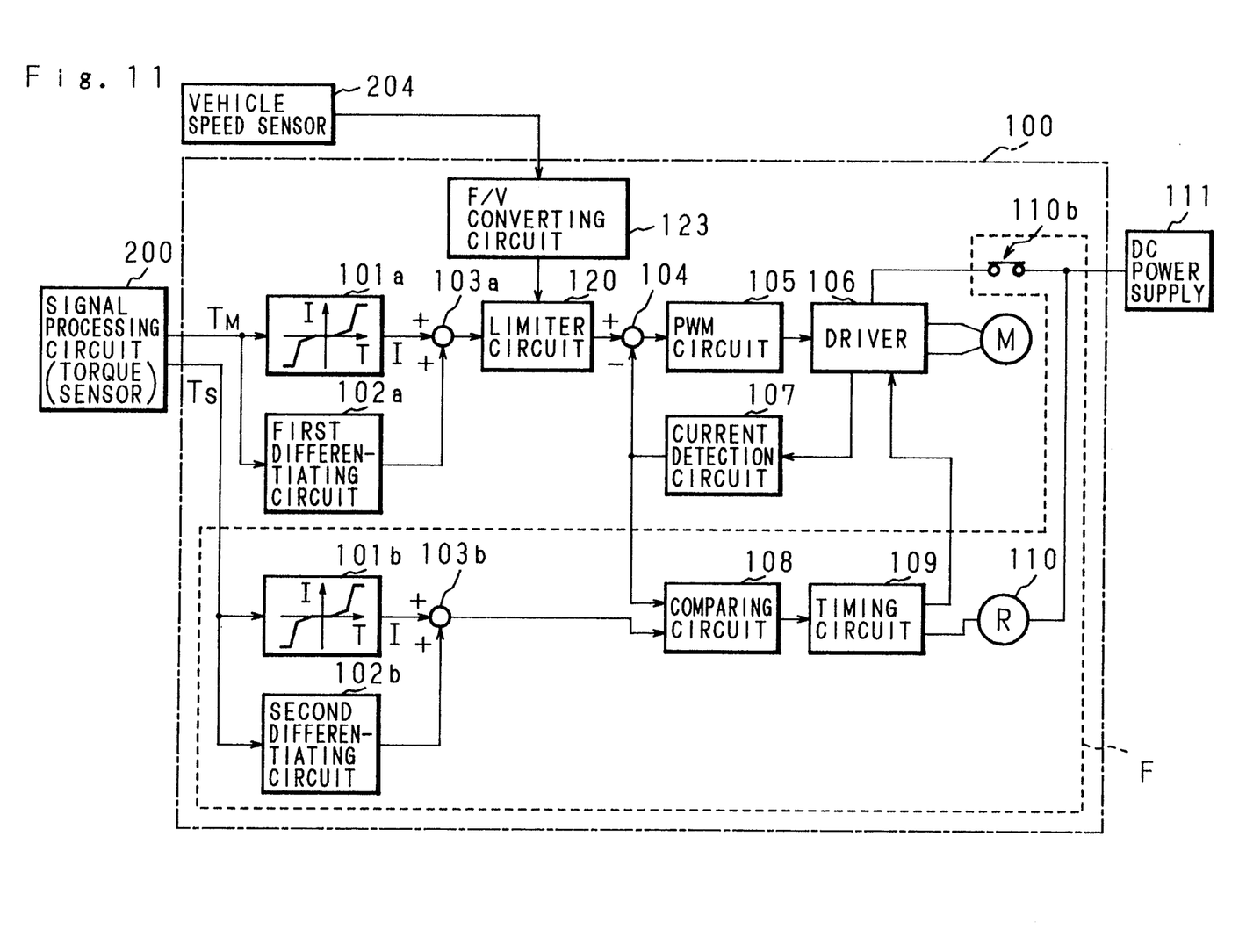
FIG. 11 is a block diagram showing a further example of the control circuit for the electric power steering apparatus of the invention.

FIG. 11 is a block diagram showing a further alternative configuration of the control circuit for the electric power steering apparatus of the invention. The voltage from the first adder 103a, representing the result of addition, is inputted to the limiter circuit. 120, and the output of the limiter circuit 120 is given to the subtractor 104.

On the other hand, there is provided a vehicle speed sensor 204 for detecting the vehicle speed. The vehicle speed sensor 204 outputs a vehicle speed detection signal which is supplied to an F/V converting circuit 123 for converting the frequency of the vehicle speed detection signal into a voltage. The F/V converting circuit 123 outputs a vehicle speed detection voltage which varies with the changing of vehicle speed and decreases as the vehicle speed increases. The vehicle speed detection voltage is supplied to the limiter circuit 120. Otherwise, the configuration is the same as that of the control circuit shown in FIG. 4, and like reference numerals are used to designate the corresponding parts to those shown in FIG. 4.

The limiter circuit 120 is identical in configuration to the circuit shown in FIG. 9. The vehicle speed detection voltage from the F/V converting circuit 123 is given to the inverting amplifier A1 in the limiter circuit 120. The voltage derived at the node between one end of the resistor R4 and the diodes D1, D2 is supplied to the subtractor 104.

In the control circuit of the above configuration, the F/V converting circuit 123 produces a varying vehicle speed detection voltage corresponding to the vehicle speed detected by the vehicle speed sensor 204, as a result of which the output voltages from the inverting amplifiers A1 and A2 in the limiter circuit 120 are varied accordingly. As in the limiter circuit shown in FIG. 9, the limiter circuit 120 sets the upper and lower limits on the voltage inputted thereto from the first adder 103a according to the output voltages from the inverting amplifiers A1 and A2 which vary with the vehicle speed detection voltage, and the thus limited voltage is supplied to the subtractor 104. The result of the subtraction by the subtractor 104, i.e. the steering assisting force command value, is given to the PWM circuit 105, to operate the switching elements of the driver 106 to drive the motor M. Accordingly, in situations where the vehicle speed sensor 204 is detecting a high vehicle speed, the vehicle speed detection voltage is low, therefore, the motor M driving current is reduced as shown by a solid line in FIG. 12, decreasing the motor M driving power and thus reducing the power to assist the steering force.

Figure 12:
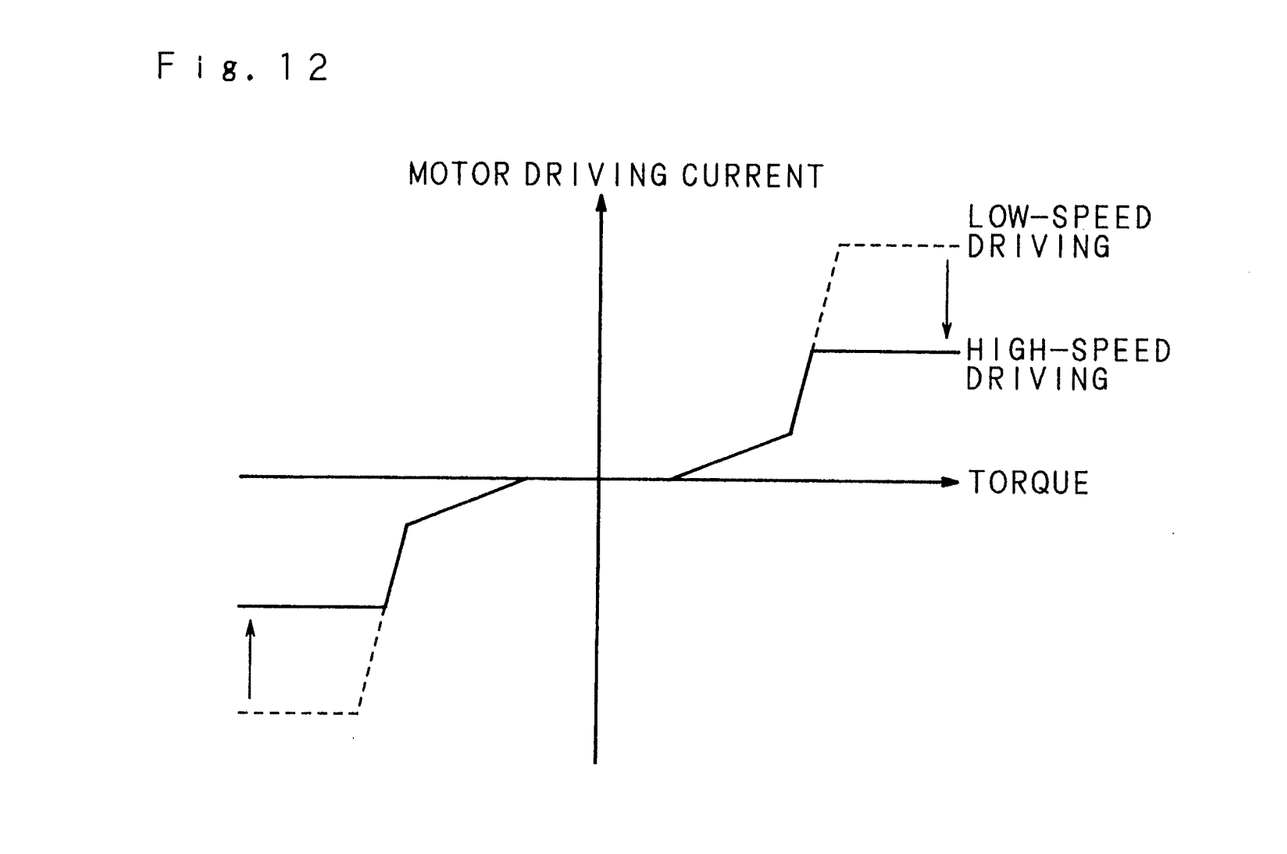
FIG. 12 is a characteristic diagram showing the relationship between the speed detected by a vehicle speed sensor and the motor driving current.

On the other hand, in situations where the vehicle speed sensor 204 is detecting a slow speed, the motor M driving current increases as shown by a dotted line in FIG. 12, thereby increasing the power to assist the steering force. In this manner, at high speed driving, the steering assisting force is reduced to increase the steering safety during high speed driving, while at slow speed driving the steering assisting force is increased to provide an efficient steering maneuver.

As described, in the electric power steering apparatus of the invention, since the signal processing circuit for the torque sensor and the control circuit for controlling the driving of the steering assisting motor are formed on the same circuit board, the number of components and the manhour required can be reduced as compared with an arrangement requiring these circuits to be formed on separate circuit boards. Thus, the invention achieves a reduction in the production cost of the apparatus.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric power steering apparatus, comprising:
   a signal processing circuit for a non-contact torque sensor for detecting a steering torque;
   a control circuit for controlling the driving of a steering assisting motor in response so the signal processing result from said signal processing circuit, said control circuit including first current output means for receiving a detected steering torque at its input and for outputting a target current value for said motor in accordance with a predetermined function;

first differentiating means for differentiating the detected steering torque;

first adding means for adding the outputs from said first current output means and said first differentiating means;

driving means for driving said motor;

current detecting means for detecting current for said motor;

subtracting means for subtracting the detection result obtained by said current detecting means from the addition result obtained by said first adding means;

first control means for outputting a driving signal to said driving means on the basis of the subtraction result obtained by said subtracting means;

second current output means for receiving a detected steering torque at its input and for outputting a target current value for said motor in accordance with a predetermined function;

second differentiating means for differentiating the detected steering torque;

second adding means for adding the outputs from said second current output means and said second differentiating means;

comparing means for comparing the addition result obtained by said second adding means with the detection result obtained by said current detecting means; and second control means for measuring the time during which the difference between the two results compared by said comparing means exceed a predetermined value and for outputting a drive disabling signal to said driving means to as to disable the driving of said motor when the measured time exceeds a predetermined time; and a circuit board for accommodating said signal processing circuit and said control circuit.

2. An electric power steering apparatus as set forth in claim 1, further comprising:
a housing for enclosing said torque sensor therein.

3. An electric power steering apparatus as set forth in claim 2, wherein
said circuit board is mounted inside said housing.

4. An electric power steering apparatus as set forth in claim 1, further comprising:
a steering shaft one end of which is connected to a steering wheel; and
a housing for enclosing said steering shaft therein.

5. An electric power steering apparatus as set forth in claim 4, wherein:
said circuit board is mounted inside said housing.

6. An electric power steering apparatus as set forth in claim 1, further comprising:
steering assisting power generating means for generating a steering assisting power; and
a housing for enclosing said steering assisting power generating means therein.

7. An electric power steering apparatus as set forth in claim 6, wherein:
said circuit board is mounted inside said housing.

8. An electric power steering apparatus as set forth in claim 1, wherein:
said control circuit further includes:
temperature detecting means for detecting the temperature of said motor;
first limiting means for setting an upper and a lower limit on the addition result obtained by said first adding means in accordance with the detection result obtained by said temperature detecting means; and
second limiting means for setting an upper and a lower limit on the addition result obtained by said second adding means in accordance with the detection result obtained by said temperature detecting means.

9. An electric power steering apparatus as set forth in claim 1, wherein:
said control circuit further includes:
voltage output means for outputting a voltage corresponding to the speed of a vehicle; and
limiting means for setting an upper and a lower limit on the addition result obtained by said first adding means in accordance with the output from said voltage output means.

* * * * *

UNITED STATES PATENT AND TRADEMARK OFFICE
CERTIFICATE OF CORRECTION

PATENT NO. : 5,355,315

DATED : October 11, 1994

INVENTOR(S) : Toshihiko DAIDO; Hirofumi MATSUOKA; Mitsuhiko NISHIMOTO; Osamu SANO It is certified that error appears in the above-identified patent and that said Letters Patent is hereby corrected as shown below:

Column 10, line 66, change "response so" to --response to--.

Column 11, line 38, change "to as to" to --so as to--.

Signed and Sealed this

Second Day of May, 1995

Attest:

BRUCE LEHMAN

*Attesting Officer*     *Commissioner of Patents and Trademarks*